Dec. 23, 1969  FRANZ DIETL  3,486,106
SYSTEM FROM LIMITING THE TIME AVERAGE VALUE OF EXCITATION
CURRENT IN A FIELD WINDING OF A VOLTAGE REGULATED
ALTERNATING CURRENT GENERATOR TO A
PRESELECTED MAXIMUM VALUE
Filed Feb. 3, 1967
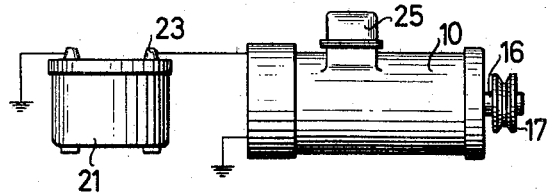
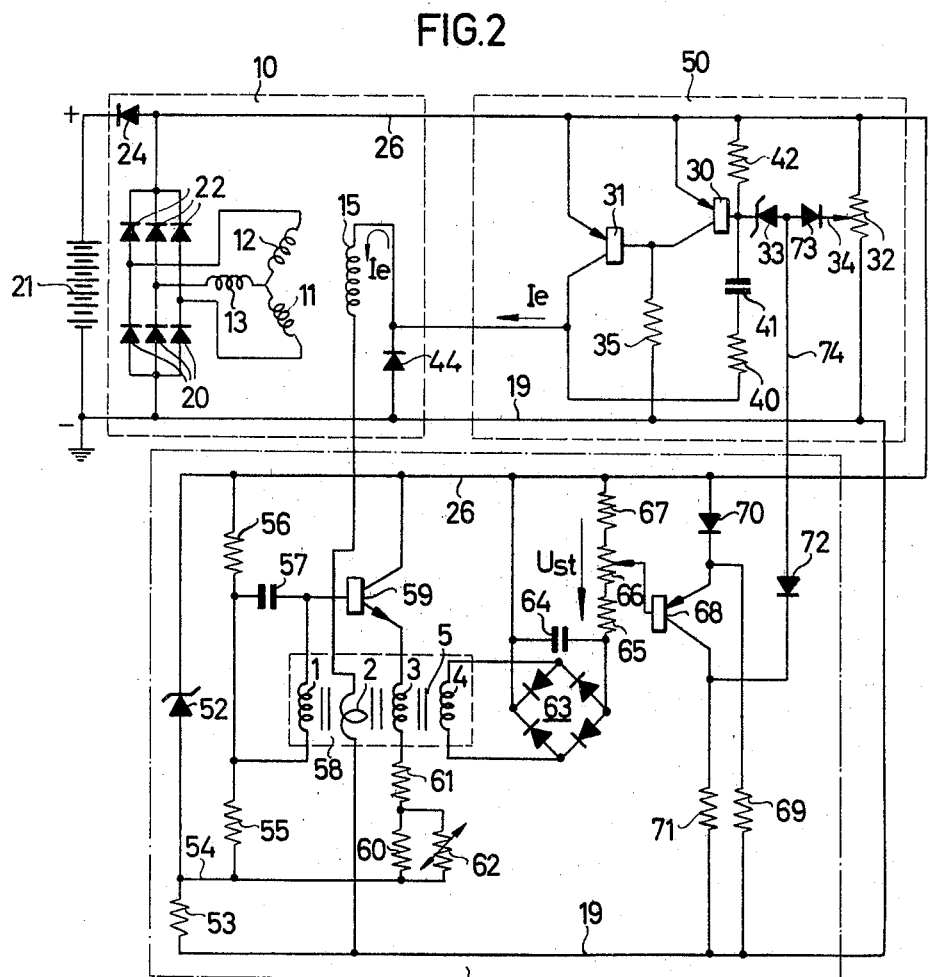
INVENTOR
Franz Dietl
by
Michael S. Striker
Atty

United States Patent Office 3,486,106
Patented Dec. 23, 1969

3,486,106
SYSTEM FOR LIMITING THE TIME AVERAGE VALUE OF EXCITATION CURRENT IN A FIELD WINDING OF A VOLTAGE REGULATED ALTERNATING CURRENT GENERATOR TO A PRESELECTED MAXIMUM VALUE
Franz Dietl, Bietigheim, Germany, assignor to Robert Bosch G.m.b.H., Stuttgart, Germany
Filed Feb. 3, 1967, Ser. No. 613,943
Claims priority, application Germany, Feb. 15, 1966, B 85,805
Int. Cl. H02p 9/30
U.S. Cl. 322—25                                     9 Claims

ABSTRACT OF THE DISCLOSURE

The field winding of an alternating current generator with a voltage regulating system is series connected to the premagnetization winding of a blocking oscillator. The output voltage of the blocking oscillator is inversely proportional to the field current. It is rectified, and if necessary amplified, and applied through a diode to the input of the voltage regulating system. The regulating system then decreases the field current when the blocking oscillator output voltage falls below a preselected value.

BACKGROUND OF THE INVENTION

This invention pertains to alternating current generators and in particular to voltage regulated alternating current generators as used for example in the lighting systems on commercial vehicles. The conventional regulating systems used for these alternating current generators operate by using a portion of the output voltage of the alternating current generator to control the flow of current through a control element in series with the field winding of the alternating current generator, thus varying the current through the field winding as a function of the output voltage of the generator. However, since the ohmic resistance of the field is dependent on temperature, it is possible to overload the control elements greatly when the engine is cold, especially when the ambient temperature is low.

SUMMARY OF THE INVENTION

According to this invention, an alternating current generator having a field winding and a first and second output conductor adapted to furnish a load voltage has a conventional voltage regulating system. This voltage regulating system has control means connected in series with said field winding, said control means being adapted to control the flow of field current in said field winding as a function of changes in said load voltage. For this alternating current generator with conventional voltage regulating system, a field current limiting system is supplied. Said field current limiting system comprises blocking oscillator means responsive to said field current and adapted to yield a blocking oscillator output voltage as a function thereof. Said blocking oscillator output voltage is coupled to said voltage regulating system in such a manner that said voltage regulating system will decrease said field current when said field current exceeds a preselected maximum value.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a diagram showing the alternating current generator, the regulator and the booster battery; and
FIG. 2 is an schematic circuit diagram showing the alternating current generator, the voltage regulating system and the field current limiting system.

DESCRIPTION OF THE PREFERRED EMBODIMENT

According to FIGS. 1 and 2, the alternating current generator has three stationary load windings, 11, 12 and 13, and a field winding 15. The field winding 15 is mounted on the armature of the alternating current generator 10, and may be driven by a motor which is not shown by means of drive pulley 17, which is situated on the armature shaft 16. The load windings 11, 12 and 13 are each connected to a negative conductor 19 by means of rectifiers 20 and are adapted to furnish current to the booster battery 21, the voltage regulating system 50, and further loads which are not shown by means of rectifiers 22, when the alternating current generator is driven with sufficient speed. Diode 24 prevents battery 21 from discharging through voltage regulating system 50 when the generator is not being driven. A further function of the diode is to assure that the voltage regulating system will work as a function of the load voltage only and not as a function of the battery voltage.

As shown in FIG. 2, the regulator 25 consists of a conventional voltage regulating system 50 and the field current limiting system 51, which is the subject of this disclosure.

The voltage regulating system 50 consists of two PNP transistors 30 and 31, a voltage divider 32 connected from load conductor 19 to load conductor 26 and a Zener diode 33 which acts as reference element and whose cathode is the voltage regulator input. The base of transistor 30 is connected to the anode of Zener diode 33, the cathode of which is connected by means of diode 73 to the tap of voltage divider 32. Transistor 30 serves as a control transistor for power transistor 31, whose emitter-collector circuit is connected in series with field winding 15 of the alternating current generator and supplies the field current, $I_e$, for this field winding, as long as the load voltage of the generator and, as is further described below, the field current, $I_e$, itself, is under a preselected maximum value. The base of power transistor 31 is connected to the collector of the control transistor 30. This collector is connected to the negative conductor 19 by means of resistance 35. As long as the load voltage of the generator has not reached its desired value, and as long as the voltage between the voltage divider tap 34 of voltage divider 32 and the conductor 26 does not exceed the breakdown voltage of Zener diode 33, the Zener diode remains in its non-conducting state and no emitter-base current flows in control transistor 30. Thus control transistor 30 is not conducting, while base current flows in transistor 31, which furnishes field current $I_e$ for the field winding of the generator. When the breakdown voltage of the Zener diode is exceeded this becomes highly conductive and causes control transistor 30 to conduct, which blocks the power transistor 31. Since the field current $I_e$ is thus interrupted, the load voltage of the generator decreases to less than the desired value. When this occurs, the Zener diode becomes non-conductive, control transistor 30 is blocked and load transistor 31 returns to its conducting state. Thus the excitation current and the output voltage rise again and the cycle starts anew.

In order to effect a very rapid response and thus an output voltage with as few variations as possible, a feedback network consisting of resistor 40 and condenser 41 is inserted between the collector of the load transistor 31 and the base of the control transistor 30. Furthermore, a resistance 42 is inserted in parallel to the emitter-base circuit of transistor 30. This causes the transistors 30 and 31 to switch rapidly from the conducting to the non-conducting state and vice versa. Transistor 31 remains conducting for a longer time thus increasing the time average value of field current $I_e$ the lower the speed of rotation and the higher the load current.

When the alternating current generator is started up from a rest condition, the excitation current $I_e$ may reach a dangerously high value prior to the blocking time of load transistor 31, especially when the ambient temperature is under the freezing point, since during the conducting state of this transistor the field current is limited only by the DC resistance of the field winding 15. However, this is much lower at low temperature than it is at the normal operating temperature of 60° C.

In order to limit the time average value of the field current flowing through the field winding 15, to a preselected maximum value independent of the output voltage of the generator a current limiting device 51 as described below is supplied.

Between the conductors 19 and 26 of the alternating current generator 10 are connected three resistors 53, 55 and 56 to form a voltage divider and parallel to the resistors 55 and 56 of this voltage divider is a Zener diode 52. A condenser 57 is parallel with a first winding of a transformer 58 is connected from the junction of resistors 55 and 56 to the base of an NPN transistor 59. Winding 2 of the transformer 58 is the premagnetization winding, and is connected in series with field winding 15 of the alternating current generator. The other terminal of this winding is connected to the negative output conductor 19. Parallel to resistors 55 and 56 is the series combination of a resistor 60, connected to the junction point of resistors 53 and 55, a resistance 61, winding 3 of transformer 58, which serves as the load winding for transistor 59, and the emitter collector circuit of transistor 59. Resistor 62, which is a negative temperature coefficient conductor is connected in parallel to resistor 60. Transformer 68 has a further winding designated as winding 4. An astable blocking oscillator is formed by the combination of transistor 59 with condenser 57 and feedback winding 51 as well as load winding 3 of transformer 58. The blocking oscillator output voltage is found in winding 4. The oscillations in this winding 4 are rectified by bridge rectifier 63 and serve to form the control voltage $U_{st}$. The amplitude of these output oscillations and therefore the magnitude of the control voltage $U_{st}$ should vary according to the strength of the premagnetization of the transformer, which is caused by the excitation current $I_e$ flowing in the premagnetization winding 2. The variation of $U_{st}$ should take place between as large and as small values as possible.

For this reason, transformer core 5 is preferably manufactured from a magnetic material trademarked Mumetal which has a substantially rectangular hysteresis curve and is an alloy consisting of 75 to 77% of nickel, 5% of copper, and 2–2.5% of chromium in addition to iron.

A filter condenser 64 and parallel voltage divider means are connected to the output terminals of rectifier bridge 63. The voltage divider means consist of a series combination of resistor 65, potentiometer 66, and a second resistor 67. The output terminal of the rectifier, which is connected with resistor 67, is also connected to output conductor 26. The tap of potentiometer 66 is connected to the input of additional amplifier means, namely the base of an amplifier transistor 68 which is a PNP type transistor. The cathode of a diode 70 is connected to output conductor 26 and the anode of diode 70 is connected to the emitter of transistor 68 and to resistance 69, whose other terminal is connected to output conductor 19. The collector of amplifier transistor 68 is connected to resistor 71 whose other terminal is connected to the output conductor 19. Furthermore, the anode of a diode 72 is connected to the collector of amplifying transistor 68. The cathode of diode 72 is connected to the junction of Zener diode 33 and diode 73.

The operation of current limiting system 51 may be explained as follows:

If the system is starting from rest the field current $I_e$ is zero and thus the current in the premagnetization winding 2 is also zero. Furthermore, no current is supplied to the blocking oscillator through conductors 19 and 26 until the operation is restarted. The restarting causes a small collector current to flow in transistor 59 which increases rapidly due to the inductive feedback between windings 1 and 3. At the same time, a voltage is induced in windings 2 and 4; the voltage induced in the premagnetization winding 2 is negligibly small, since this winding has only a single loop. The emitter-collector current in transistor 59 increases until core 5 of transformer 59 is saturated. Then the voltage induced in winding 1 collapses: transistor 59 is blocked and winding 3 is disconnected from the load voltage of the alternating current generator 10 until the cycle is repeated.

For a very small or a constant average value of field current, $I_e$, oscillations of a definite amplitude and frequency are generated in the blocking oscillator. The blocking oscillator output voltage generated in the output windings 4 is rectified by the rectifier 63, filtered by condenser 64, and fed to potentiometer 66 in the form of a varying direct current. This is amplified by transistor 68 and is fed to the input of the control transistor 30 by means of diode 72 and Zener diode 33.

When the field current $I_e$ of the generator does not approach zero, a constant direct current premagnetization is superimposed on the alternating magnetization of core 5 of transformer 58. Winding 2 is of such polarity, that the core 5 is premagnetized in the same direction as that in which the electrical oscillations of the blocking oscillator affect it. Thus the core 5 becomes saturated more rapidly the greater the premagnetization. Thus, for increasing excitation current $I_e$, the amplitude of the electrical oscillations of the blocking oscillator decreases while the frequency increases slightly. Thus the control voltage $U_{st}$ which is the voltage induced in winding 4 and rectified by rectifier bridge 63 decreases with increasing field current $I_e$. The same is true for the varying direct current following in potentiometer 66. Furthermore, the variation of these quantities in the control region is approximately inversely proportional to the field current $I_e$. Thus, the collector potential of amplifier transistor 68, which is coupled back to control transistors 30 over diode 72 and Zener diode 33, decreases proportionately to increasing field current $I_e$. This means that the current limiting device 51 can cause the breakdown of Zener diode 33 independent of the load voltage of the alternating current generator 10. It can thus cause control transistor 30 to conduct and load transistor 31 to flip to the nonconducting state as soon as the breakdown voltage of the diode 33 is exceeded. Thus the maximum value of field current $I_e$ is limited to a maximum which may be selected at potentiometer 66. It is the purpose of diode 73 to assure that potentiometer 32 does not load the output of the current limiting device 51. Thus a sharply defined current regulation results when the preselected maximum value of field current $I_e$ is reached. Furthermore diode 73 also prevents a change in the setting of potentiometer 32 by the presence of the current limiting device 51 so that the voltage regulator is not affected by the presence of the field current limiting system as long as $I_e$ is less than the preselected maximum value.

By changing the capacity of condenser 57 the frequency of the blocking oscillator oscillation and therefore the relationship of control voltage $U_{st}$ to the excitation current $I_e$ may be changed. Lare values of capacitance of condenser 57 result in low frequencies and therefore in a small region of current regulation, while small values of capacitance result in high frequencies and in greater regions of current regulator control.

Negative temperature coefficient conductor 62 serves to compensate for the temperature-variable characteristics of magnetic core 5 of transformer 58. With this it can be accomplished that the current limiting device 51 operates to control the current within a temperature range of from −40° C. to +100° C. Since the output winding 4 is only inductively coupled to the other windings of transformer 58, and the control voltage $U_{st}$ is not tied to a particular ground potential and thus can be fed directly into the regulator circuit of amplifier 68, a very simple arrangement results for the current limiting device 51, especially since Zener diode 33 may serve as reference element for the voltage regulating system as well as for the field current limiting system.

While the invention has been illustrated and described as embodied in a transistorized system, it is not intended to be limited to the details shown, since various modifications and changes in circuits and circuit elements may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. In a voltage regulated alternating current generator having a field winding, load windings, a first and second output conductor adapted to furnish a regulated load voltage, a voltage regulating system responsive to changes in said load voltage and adapted to control the flow of excitation current in said field winding, said voltage regulating system having a voltage regulator input: a system for limiting the average value of said field current to a preselected maximum value, comprising, in combination, amplifier means; transformer means interconnected with said amplifier means to form a blocking oscillator circuit, said transformer means having a core, a premagnetization winding connected in series with said field winding, and adapted to change the magnetization of said core as a function of the field current flowing in said field winding, an output winding adapted to furnish a blocking oscillator output signal in dependence upon the premagnetization of said core, and a load winding connected to said amplifier means; and coupling means to couple said blocking oscillator output signal to said voltage input in such a manner as to cause said voltage regulating system to decrease said field current when said field current exceeds said preselected maximum value.

2. A system as set forth in claim 1, also comprising means for compensating for changes in the characteristics of said core due to temperature, connected to said load winding.

3. In a voltage regulated alternating current generator having a field winding, load windings, a first and second output conductor adapted to furnish a regulated load voltage, a voltage regulating system responsive to changes in said load voltage and adapted to control the flow of excitation current in said field winding, said voltage regulating system having a voltage regulator input: a system for limiting the average value of said field current to a preselected maximum value, comprising, in combination, blocking oscillator means responsive to said field current and adapted to furnish a blocking oscillator output voltage as a function thereof; rectifier means adapted to rectify said blocking oscillator output voltage to yield a rectified blocking oscillator output voltage; and coupling means to couple said blocking oscillator output voltage to said regulator input in such a manner as to cause said voltage regulating system to decrease said field current when said field current exceeds said preselected maximum value.

4. A system as set forth in claim 3, also comprising additional amplifier means adapted to amplify said rectified blocking oscillator output signal.

5. A system as set forth in claim 4, also comprising voltage divider means connected across said additional rectifier means and adapted to feed a portion of said rectified blocking oscillator output signal to said additional amplifier means.

6. A system as set forth in claim 3, also comprising a filter condenser connected across said rectifier means.

7. In a voltage regulated alternating current generator having a field winding, load windings, a first and second output conductor adapted to furnish a regulated load voltage, a voltage regulating system responsive to changes in said load voltage and adapted to control the flow of excitation current in said field winding, said voltage regulating system having a voltage regulator input: a system for limiting the average value of said field current to a preselected maximum value, comprising, in combination, blocking oscillator means responsive to said field current and adapted to furnish a blocking oscillator output voltage as a function thereof; and diode coupling means connected in such a manner that said blocking oscillator output voltage is coupled to said voltage regulator input when said field current exceeds said preselected maximum value, and that said voltage regulator input is decoupled from said blocking oscillator means when said field current is less than said preselected maximum value.

8. In a voltage regulated alternating current generator having a field winding, load windings, a first and second output conductor adapted to furnish a regulated load voltage, a voltage regulating system responsive to changes in said load voltage and adapted to control the flow of excitation current in said field winding, said voltage regulating system having a voltage regulator input: a system for limiting the average value of said field current to a preselected maximum value, comprising, in combination, blocking oscillator means responsive to said field current and adapted to furnish a blocking oscillator output voltage as a function thereof; coupling means to couple said blocking oscillator output voltage to said voltage regulator input in such a manner as to cause said voltage regulating system to decrease said field current when said field current exceeds said preselected maximum value; additional voltage divider means, having a voltage divider tap, connected from said first output conductor to said second output conductor; and a decoupling diode connected between said coupling means and said voltage divider tap in such a manner that said coupling means is decoupled from said voltage divider tap.

9. In a voltage regulated alternating current generator having a field winding, load windings, a first and second output conductor adapted to furnish a regulated load voltage, a voltage regulating system responsive to changes in said load voltage and adapted to control the flow of excitation current in said field winding, said voltage regulating system having a voltage regulator input: a system for limiting the average value of said current to a preselected maximum value, comprising, in combination, amplifier means; transformer means, interconnected with said amplifier means in such a manner that a blocking oscillator circuit is formed, said transformer means having a core with a substantially rectangular hysteresis curve; said blocking oscillator circuit being responsive to said field current and adapted to furnish a blocking oscillator output voltage as a function thereof; and coupling means to couple said blocking oscillator output voltage to said voltage regulator input in such a manner as to cause said voltage regulating system to decrease said field current when said field current exceeds said preselected maximum value.

(References on following page)

References Cited

UNITED STATES PATENTS 3,209,234  9/1965  Bridgeman et al. _____ 322—28

FOREIGN PATENTS 983,519  2/1965  Great Britain.

ORIS L. RADER, Primary Examiner
H. HUBERFELD, Assistant Examiner

U.S. Cl. X.R.

322—28, 73